US005748229A

United States Patent [19]

Stoker

[11] Patent Number: 5,748,229
[45] Date of Patent: May 5, 1998

[54] SYSTEM AND METHOD FOR EVALUATING VIDEO FIDELITY BY DETERMINING INFORMATION FRAME RATE

[75] Inventor: Edward J. Stoker, Plano, Tex.

[73] Assignee: MCI Corporation, Washington, D.C.

[21] Appl. No.: 670,865

[22] Filed: Jun. 26, 1996

[51] Int. Cl.⁶ .................................................. H04N 17/00
[52] U.S. Cl. ..................................... 348/180; 348/184
[58] Field of Search ................................ 348/175, 177, 348/180, 181, 184, 187, 188, 190, 500; H04N 17/00

[56] References Cited

U.S. PATENT DOCUMENTS 3,612,760  10/1971  McKechnie ............................ 348/181
4,887,279  12/1989  Odenheimer .......................... 348/180

*Primary Examiner*—Victor R. Kostak

[57] ABSTRACT

A system and method for evaluating video fidelity by calculating information frame rate. A time mechanism is sampled to obtain a time video signal. A visual excitation device is also sampled to obtain an information video signal. The time video signal is superimposed over the information video signal to produce a combined video signal. The combined video signal is transmitted over a system under test (SUT). The signal that exits the SUT is called a processed video signal. The processed video signal is analyzed to determined the information frame rate of the SUT.

11 Claims, 6 Drawing Sheets

SYSTEM AND METHOD FOR EVALUATING VIDEO FIDELITY BY DETERMINING INFORMATION FRAME RATE

BACKGROUND OF THE INVENTION

1. Field of the Invention

The present invention relates generally to video processing, and more particularly to a system and method for measuring the fidelity of video.

2. Related Art

Various devices exist or are being developed for transferring video signals over existing voice telephony lines. Video phones, for example, operate in this manner.

Video signals transmitted over this communication medium are subject to a limited bandwidth (less than 4 KHz) and, therefore, a limited data rate for carrying image information. Consequently, the telephony transmission path over which video signals are transmitted must include video compression devices to provide a reasonable image quality and refresh rate.

The efficacy of a video compression device is directly related to its information frame rate. Information frame rate is defined as the number of frames of information that are transmitted per second. The greater the information frame rate, the better the video compression device is at compressing video.

The usefulness of information frame rate as a measure of video efficacy is not limited to video compression devices. Instead, information frame rate is an effective general indicator of how well a video transmission path, and the components in the video transmission path, process and transmit video signals.

Thus, what is required is a system and method for determining information frame rate.

SUMMARY OF THE INVENTION

Briefly stated, the present invention is directed to a system and method for evaluating video fidelity by calculating information frame rate. A time mechanism is sampled to obtain a time video signal. A visual excitation device is also sampled to obtain an information video signal. The time video signal is superimposed over the information video signal to produce a combined video signal. The combined video signal is transmitted over a system under test (SUT). The signal that exits the SUT is called a processed video signal. The processed video signal is analyzed to determined the information frame rate of the SUT.

The information frame rate is determined as follows. A first frame of the processed video signal is viewed. Subsequent frames of the processed video signal are also viewed until one having different information content than the first frame is located (the frame that is so located is called the next frame for reference purposes). A first time corresponding to the first frame is then determined by reference to the image portion of the first frame corresponding to the time video signal. Similarly, a second time corresponding to the next frame is then determined by reference to the image portion of the next frame corresponding to the time video signal. The information frame rate of the SUT is then calculated according to the following equation:

$$\text{information frame rate} = 1/(\text{second time} - \text{first time}).$$

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for providing measures and statistics as to the video efficacy of a video transmission path and the components in the video transmission path. These measures and statistics are indicators of how well the video transmission path and the components therein process and transmit video signals. As an example, these measures and statistics can be used as benchmarks for comparatively evaluating competing video processing devices, such as competing data compression devices and algorithms.

Figure 1:
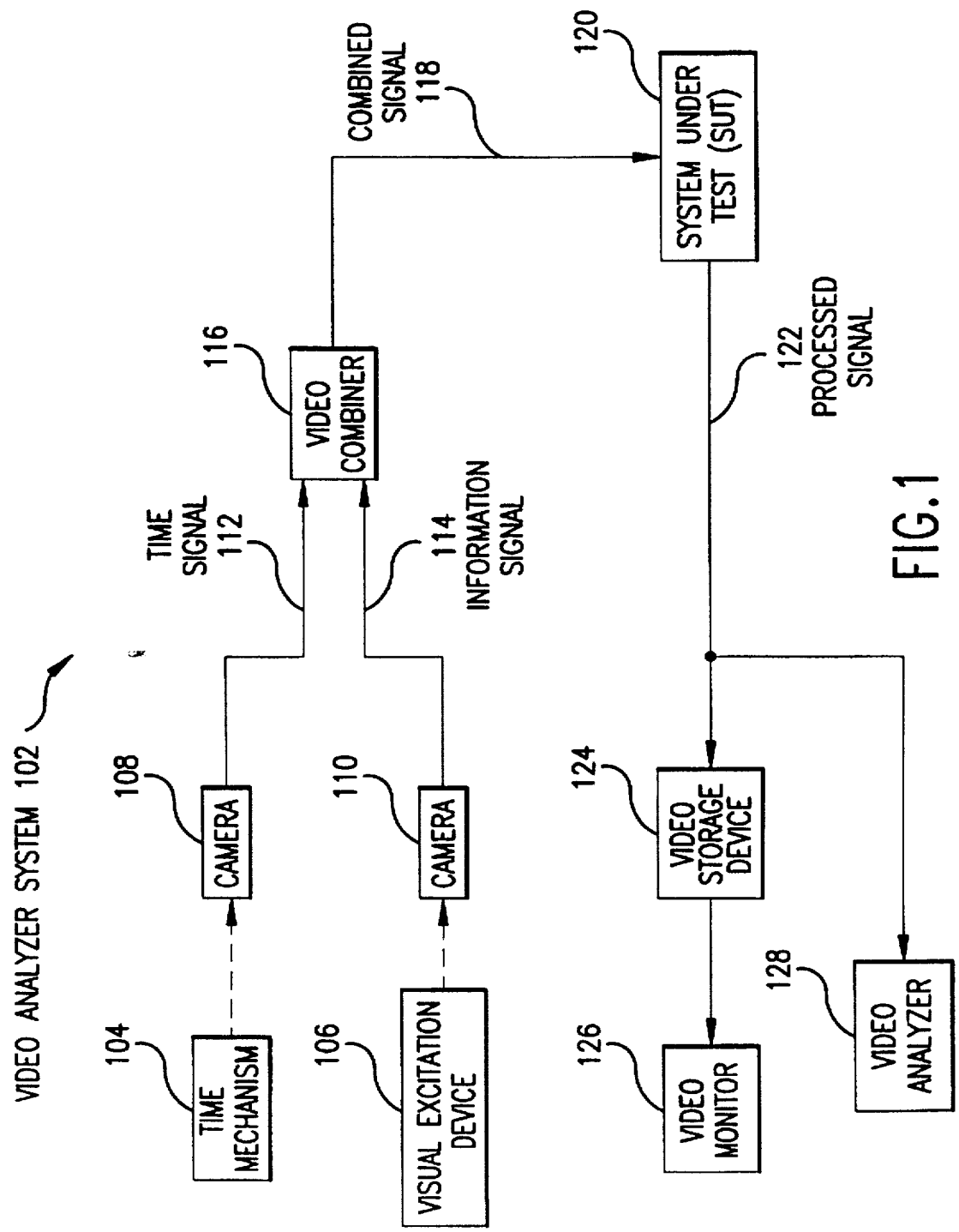
FIG. 1 is a block diagram of a video analyzer system according to a preferred embodiment of the present invention.
Figure 2:
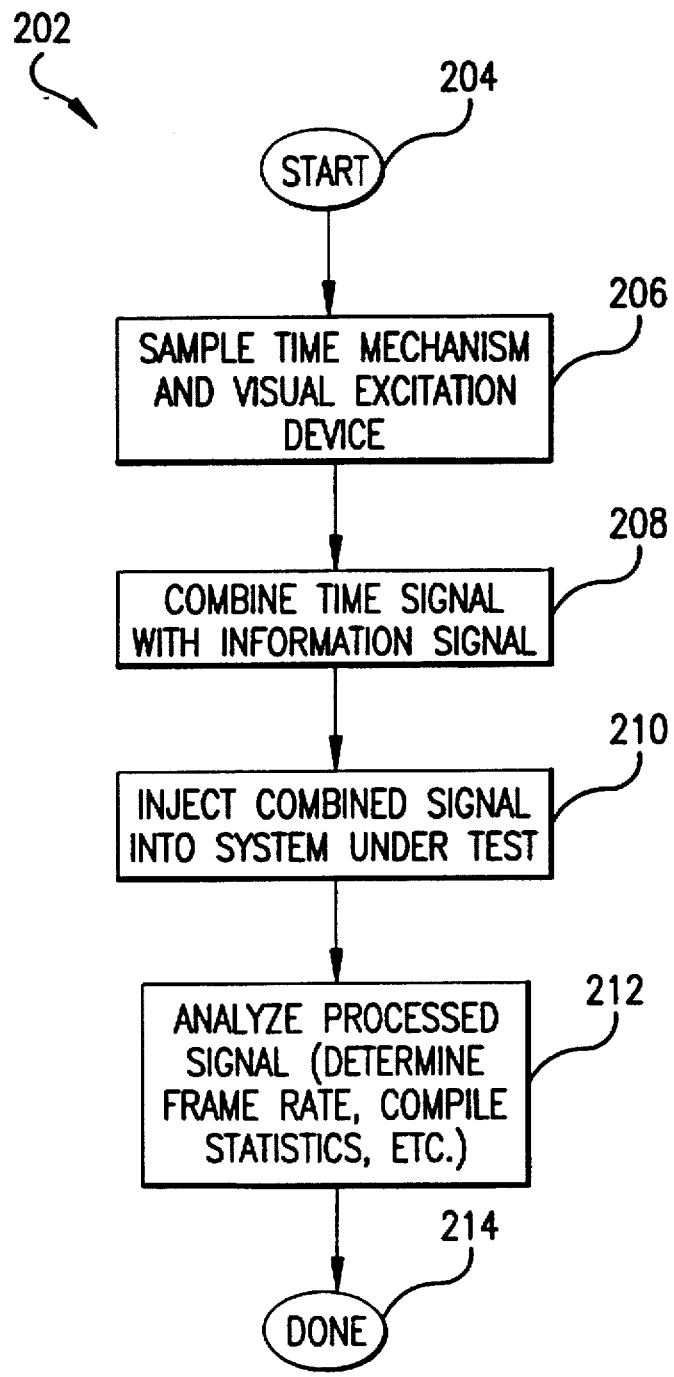
FIGS. 2 and 8 are flowcharts representing the preferred operation of the invention.

FIG. 1 is a block diagram of a video analyzer system 102 according to a preferred embodiment of the present invention. FIG. I shall be described with reference to a flowchart 202 in FIG. 2. Flowchart 202 represents the manner in which the video analyzer system 102 tests and generates measures and statistics for a system under test (SUT) 120. Such measures and statistics include the information frame rate of the SUT 120. Flowchart 202 begins with step 204, where control immediately passes to step 206.

Figure 3:
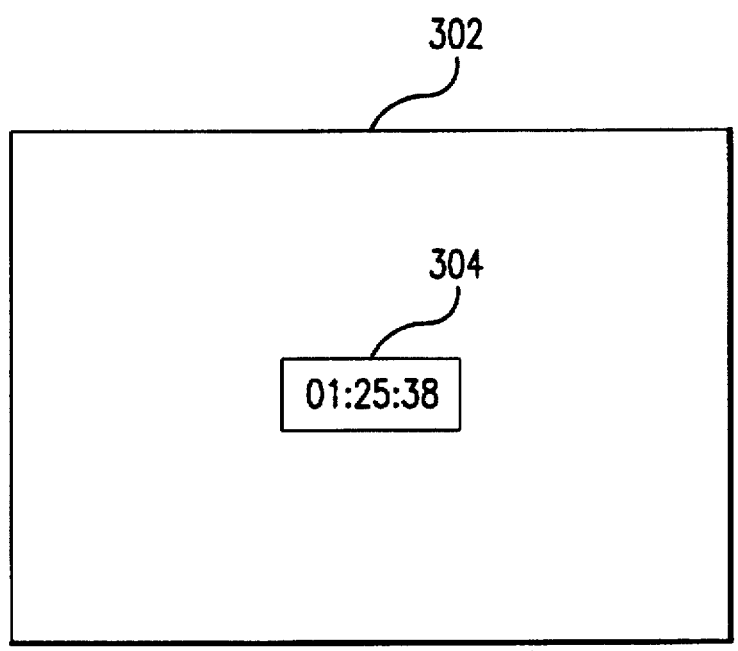
FIG. 3 represents a time video signal.

In step 206, a first video camera 108 samples a time mechanism 104 to thereby produce a first video signal, called a time video signal 112 for reference purposes. The time mechanism 104 is a device which keeps track of and visually indicates the passage of time, such as a clock or stop watch. Preferably, the time mechanism 104 visually indicates the passage of time to at least hundredths of a second. An example of the time video signal 112 when displayed on a video monitor is shown in FIG. 3. FIG. 3 depicts a video frame 302 which includes an image 304 of the time mechanism 104.

Also in step 206, a second video camera 110 samples a visual excitation device 106 to thereby generate a second video signal, called an information video signal 114 for reference purposes. The visual excitation device 106 is a visual stimulation device that is engineered to provide maximum visual excitation. Preferably, the visual excitation device 106 is a rotating test pattern assembly.

Figure 5:
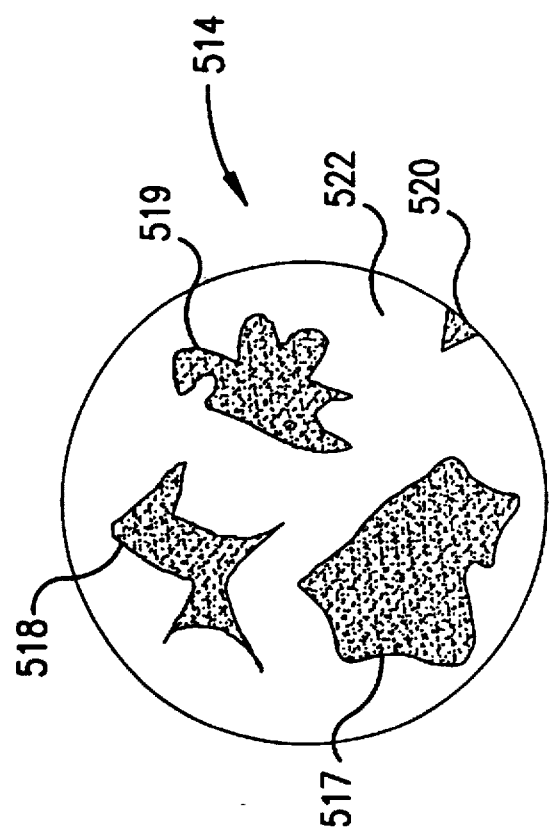
FIGS. 4 and 5 represent embodiments of a visual excitation device.
Figure 4:
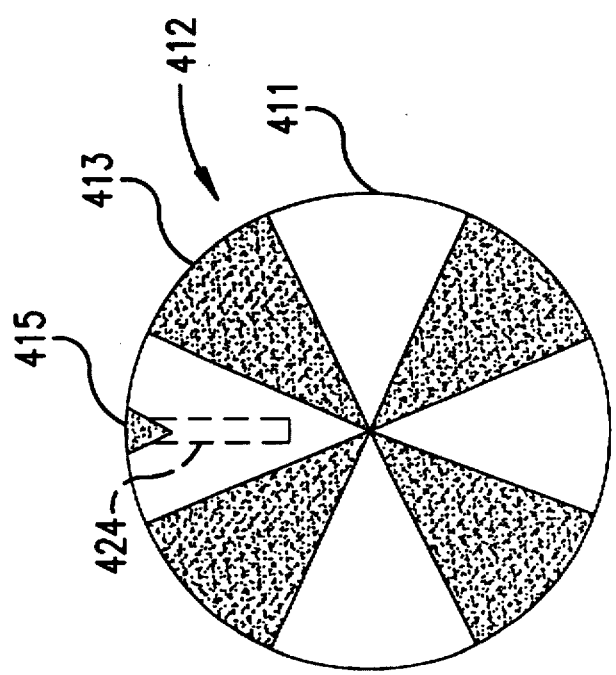

Referring to FIGS. 4 and 5, the rotating test pattern assembly 104 comprises a test pattern 412 or 514 printed on a disk. The disk is driven in rotation by a speed-controlled motor (not shown). The speed of the motor may be automatically controlled by a test controller (not shown), or it may be manually controlled by a human test operator manipulating a speed controller (not shown). Pattern 412 comprises alternating light and dark pie-shaped segments 411 and 413, respectively. Pattern 514 comprises on a light background multiple dark asymmetric shapes 517, 518, and 519, each having a different shape.

Test patterns other than the symmetrical pattern 412 or the asymmetric pattern 514 may be printed on the disk. Although black and white patterns are preferred for their contrast, a plurality of other colors may be employed instead, as long as the required contrast is provided between adjacent colors. The number of pie-shaped segments in pattern 412 and the number of dark shapes in pattern 514 may also be varied from at least 3, preferably 6 to 20, and more preferably 8 to 16. The pie-shaped segments are preferably in alternating colors such that there is a shape contrast between adjacent segments. The colors preferred are black and white.

An index mark 415, 520 is on the front of each pattern 412 and 514. This mark is particularly important where the disk pattern is symmetrical, as with the pattern 412, so that each full revolution of the disk may be observed, thus allowing the counting of the number of incremental jumps in the video picture image per revolution of the disk.

The size of the rotating disk pattern should be sufficient to fill substantially the entire visual field of the cameras 108, 110. For conventional cameras, the diameter of the disk pattern is preferably 10 to 50 inches, more preferably 20 to 40 inches, and most preferably about 30 inches. Of course, the diameter of the disk pattern will vary and will depend on the cameras actually used.

The visual excitation device 106 is further described in pending U.S. patent application entitled "Rotating Visual Display for Video Testing," Ser. No. 08/530,635, filed Sep. 20, 1995, which is incorporated herein by reference in its entirety.

Referring again to FIG. 1, the first and second cameras 108, 110 are any well known video cameras capable of generating well known NTSC (National Television System Committee) signals. As will be appreciated, NTSC signals are standard analog television signals and include 30 frames per second. The time video signal 112 and the information video signal 114 are preferably standard NTSC signals, i.e., standard television signals.

Figure 7:
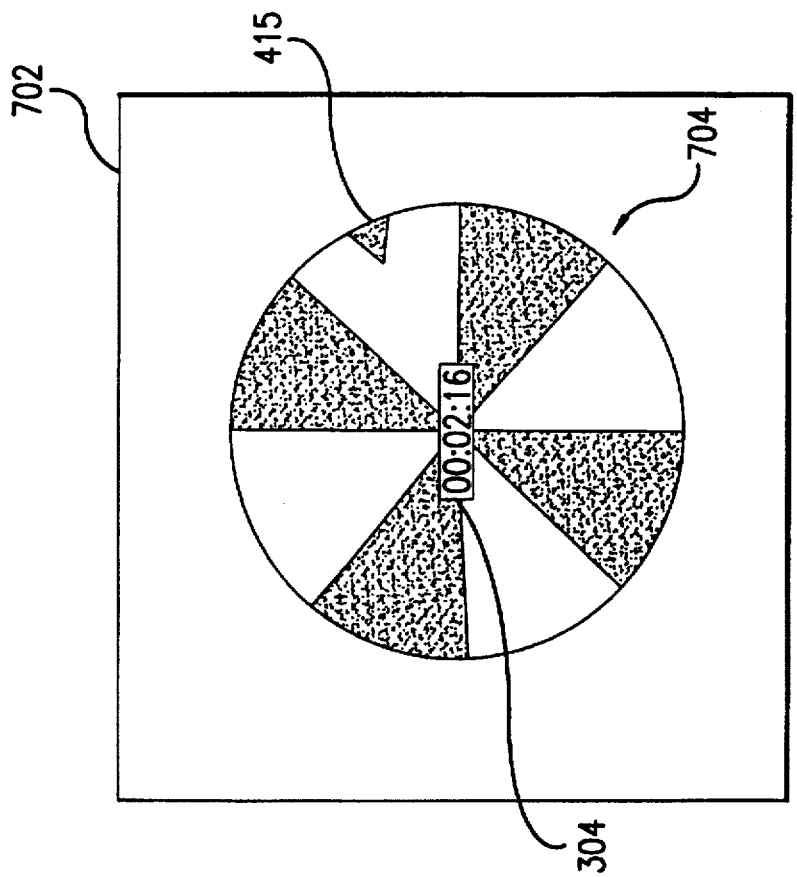
FIGS. 6 and 7 are examples of a combined video signal produced by the present invention.
Figure 6:
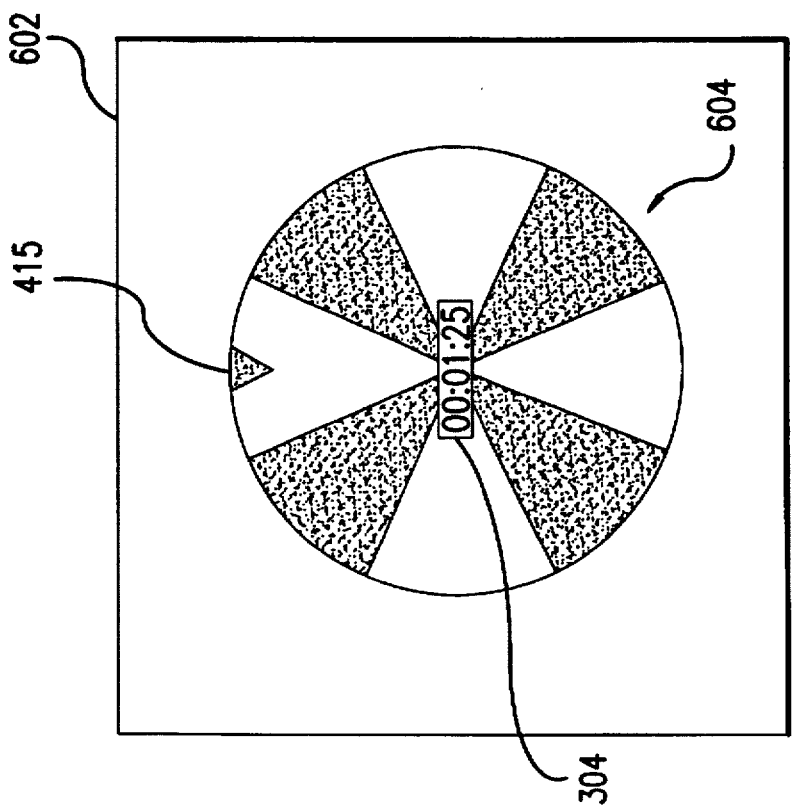

In step 208, the time video signal 112 and the information video signal 114 are combined by a video combiner 116 to produce a third video signal, called the combined video signal 118 for reference purposes. Preferably, the video combiner 116 superimposes the image of the time mechanism 104 contained in the time video signal 112 over the image of the visual excitation device 106 in the information video signal 114. Preferably, the image of the time mechanism 104 is superimposed at a central location over the image of the visual excitation device 106. Examples of the combined video signal 118 (when viewed on a video monitor) are shown in FIGS. 6 and 7. The procedure for combining the time video signal 112 with the information video signal 114 to produce the combined video signal 118 as shown in FIGS. 6 and 7 will be apparent to persons skilled in the relevant art(s). The combined video signal 118 is preferably an NTSC signal. The video combiner 116 can be implemented using any well known and commercially available video special effects generator, such as a JVC Colour Special Effects Generator, Model KM-2500, JVC, Victor Company of Japan, Limited. Other types of video processing devices that can combined video signals as discussed herein could alternatively be used.

In step 210, the combined video signal 118 is injected into a system under test (SUT 120). The SUT 120 includes a transmission path over which the combined video signal 118 is transmitted. The transmission path can include any combination of devices which are of interest and which one wishes to test, such as compression devices, echo cancelers, channel banks, image receptors, encoders, decoders, etc. Thus, it is possible to test individual components or combinations of components by appropriately configuring these components in the SUT 120. For reference purposes, upon exit from the SUT 120, the combined video signal 118 is called the processed signal 122.

In step 212, the processed signal 122 is analyzed. The invention envisions a number of different ways to analyze the processed signal 122.

Figure 8:
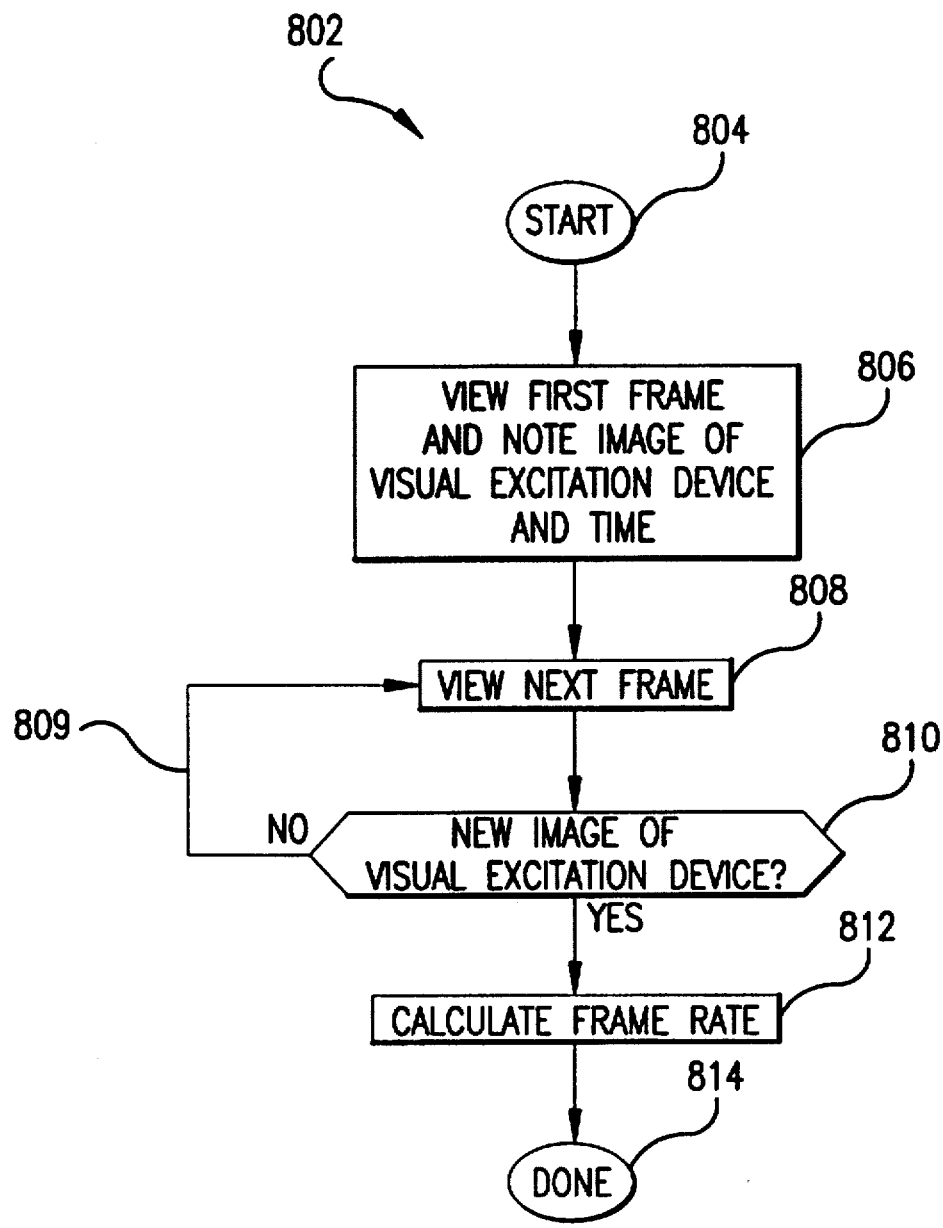

The first way involves calculating the information frame rate of the SUT 120. A video recording and storage device 124, such as a conventional video cassette recorder (VCR), records the processed signal 122. At a latter time, a human operator views the processed signal 122 on a frame-by-frame basis on a video monitor 126 to calculate the information frame rate. The manner in which the human operator does this is represented by a flowchart 802 in FIG. 8. Flowchart 802 begins with step 804, where control immediately passes to step 806.

In step 806, the human operator views the first frame of the processed signal 112. For example purposes, suppose that frame 602 in FIG. 6 is this first frame. The human operator records the time shown in the image 304 of the time mechanism, and also notes the image 604 of the visual excitation device 106.

In step 808, the human operator views the next frame of the processed signal 112.

In step 810, the human operator determines whether the information content of this next or subsequent frame (viewed in step 808) differs from the information content of the first frame (viewed in step 806). (For example, it is possible to make this determination by comparing the relative positions of the index mark 415 in the first and subsequent frames.) Due to the limited bandwidth of the transmission path in the SUT 120, the information content will most likely not change from frame to frame. If the human operator determines that the information content did not change, then control returns to step 808 wherein the human operator views the next frame. The human operator continues to view frames until one with information content different from the first frame (viewed in step 806) is found. At that point, step 812 is performed.

In step 812, the human operator calculates the information frame rate of the SUT 120. For example purposes, suppose that frame 702 in FIG. 7 is the subsequent frame viewed in step 808, and determined in step 810 to have different information content than the first frame viewed in step 806 (and shown in FIG. 6). The relative time of the first frame shown in FIG. 6 is 00:01:25 seconds. The relative time of the subsequent frame shown in FIG. 7 is 00:02:16 seconds. The difference between these times is 0.91 seconds. Thus, the human operator determines that a new information frame is being transmitted over the SUT 120 every 0.91 seconds. Accordingly, the human operator determines that the information frame rate of the SUT 120 is 1 divided by 0.91, or 1.099 frames per second. Flowchart 802 is complete after step 812 is performed, as indicated by step 814.

In order to obtain a more accurate measurement of the information frame rate of the SUT 120, the human operator may perform the steps of flowchart 802 a number of times over different portions of the processed signal 122, and then average the respective results.

It is noted that the steps of flowchart 802 could alternatively be performed by an automated mechanism, such as video analyzer 128, that includes image recognition capabilities.

Referring again to FIG. 2, the invention envisions other ways to analyze the processed signal 122 in step 212. One way involves obtaining statistics on the processed signal 122. One statistic is the number of frames in the processed signal 122 that have the same information content. For example, the invention may calculate the number of frames in the processed signal 122 that have the information content shown in FIG. 6. This is accomplished by performing the steps of flowchart 802 in FIG. 8, except an additional step (not shown) is added in the path from step 810 to step 808. In this step, a counter is incremented. This counter represents the number of frames that have the same information content as the first frame viewed in step 806.

More particularly, a first frame of the processed video signal 122 is viewed (as in step 806). The next frame is also viewed (as in step 808). A determination is made as to whether the first frame and the next frame have the same information content (as in step 810). If the first frame and the next frame have the same information content, then a counter is incremented (the counter is originally initialized to 1). This process is repeated until a frame is encountered that does not have the same information content as the first frame. The counter represents the number of consecutive frames in the processed signal 122 that have the same information content as the first frame. Preferably, the processing just described is automatically performed by the video analyzer 128. The video analyzer 128 has image recognition capabilities. Implementation of the video analyzer 128 will be apparent to persons skilled in the relevant art(s).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of evaluating video fidelity, comprising the steps of:
   (1) sampling a time mechanism to thereby obtain a time video signal;
   (2) sampling a visual excitation device to thereby obtain an information video signal;
   (3) superimposing the time video signal over the information video signal to thereby produce a combined video signal;
   (4) transmitting the combined video signal over a system under test (SUT), wherein a processed video signal exits from the SUT; and
   (5) analyzing the processed signal to thereby evaluate the video fidelity of the SUT.

2. The method of claim 1, wherein the combined video signal comprises a first image superimposed over a second image, said first image corresponding to the time video signal and said second image corresponding to the information video signal.

3. The method of claim 2, wherein step (5) comprises the steps of:
   (a) viewing a first frame of the processed video signal;
   (b) viewing a next frame of the processed video signal;
   (c) determining whether the first frame and the next frame have the same information content;
   (d) if the first frame and the next frame do not have the same information content, then determining a first time corresponding to the first frame by reference to the first image in the first frame, and determining a second time corresponding to the next frame by reference to the first image in the next frame; and
   (e) calculating an information frame rate of the SUT based on the first time and the second time.

4. The method of claim 3, wherein step (e) comprises the step of:
   calculating the information frame rate of the SUT according to the following equation:

$$\text{information frame rate} = 1/(\text{second time} - \text{first time}).$$

5. The method of claim 3, wherein step (5) further comprises the step of:
   (f) if the first frame and the next frame have the same information content, then returning to step (b).

6. The method of claim 1, wherein step (5) comprises the steps of:
   (a) viewing a first frame of the processed video signal;
   (b) viewing a next frame of the processed video signal;
   (c) determining whether the first frame and the next frame have the same information content;
   (d) if the first frame and the next frame have the same information content, then incrementing a counter;
   (e) returning to step (b) if there are more frames in the processed video signal;
   wherein the counter represents the number of frames consecutive to the first frame in the processed video signal having the same information content as the first frame.

7. A system for evaluating video fidelity, comprising:
   a first video camera to sample a time mechanism to thereby obtain a time video signal;
   a second video camera to sample a visual excitation device to thereby obtain an information video signal;
   a video combiner to superimpose the time video signal over the information video signal to thereby produce a combined video signal;
   a system under test having a transmission path over which the combined video signal is transmitted, wherein a processed video signal exits from the SUT; and
   analyzing means for analyzing the processed signal to thereby evaluate the video fidelity of the SUT.

8. The system of claim 7, wherein the combined video signal comprises a first image superimposed over a second image, said first image corresponding to the time video signal and said second image corresponding to the information video signal.

9. The system of claim 8, wherein said analyzing means comprises:
   means for viewing a first frame of the processed video signal;
   means for viewing a next frame of the processed video signal;
   means for determining whether the first frame and the next frame have the same information content;
   means for determining a first time corresponding to the first frame by reference to the first image in the first frame, and determining a second time corresponding to the next frame by reference to the first image in the next frame, if the first frame and the next frame do not have the same information content; and calculating means for calculating an information frame rate of the SUT based on the first time and the second time.

10. The system of claim 9, wherein said calculating means comprises:

means for calculating the information frame rate of the SUT according to the following equation:

$$information\ frame\ rate = 1/(second\ time - first\ time).$$

11. The system of claim 7, wherein said analyzing means comprises:

means for viewing a first frame of the processed video signal;

means for viewing a next frame of the processed video signal;

means for determining whether the first frame and the next frame have the same information content;

means for incrementing a counter if the first frame and the next frame have the same information content;

wherein the counter represents the number of frames consecutive to the first frame in the processed video signal having the same information content as the first frame.

* * * * *